Sept. 14, 1948.　　　　　F. M. FRAGA　　　　　2,449,212
　　　　　　　　　　　　TRACTOR SCOOP
Filed May 17, 1946　　　　　　　　　　　　4 Sheets-Sheet 2

INVENTOR.
Frank M. Fraga
BY
ATTYS

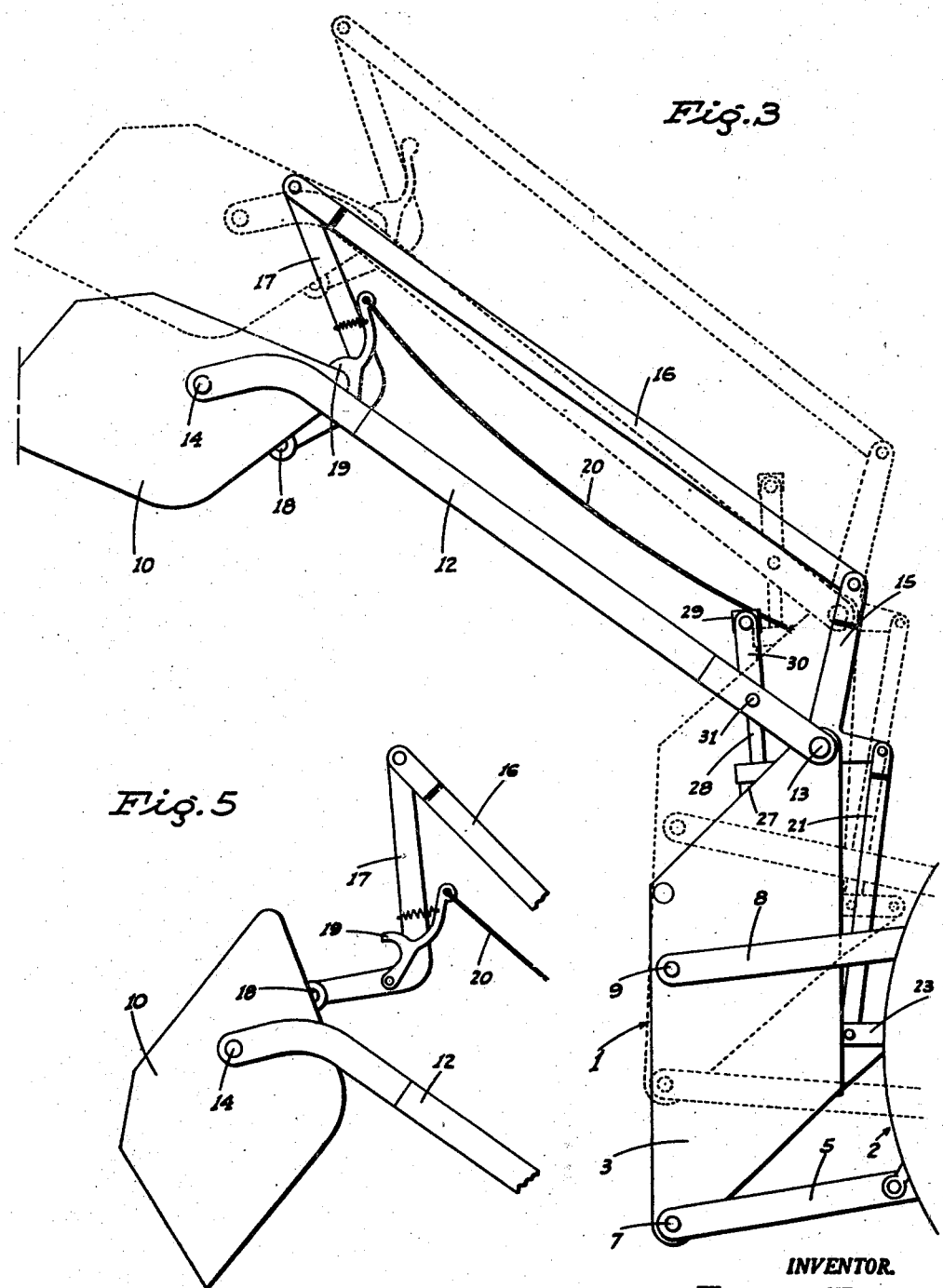

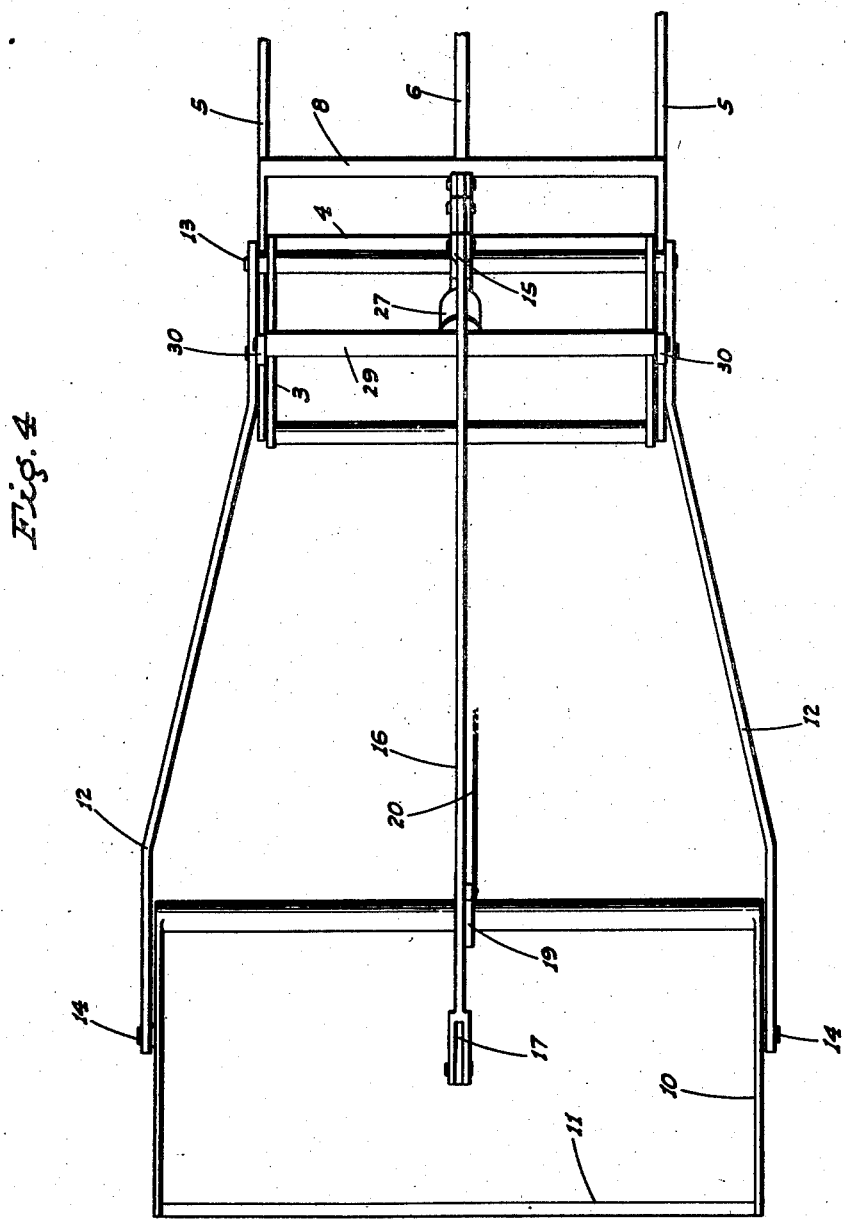

Patented Sept. 14, 1948

2,449,212

UNITED STATES PATENT OFFICE 2,449,212

TRACTOR SCOOP

Frank M. Fraga, Fresno, Calif.

Application May 17, 1946, Serial No. 670,581

13 Claims. (Cl. 214—140)

This invention is directed to, and it is an object to provide, an improved tractor scoop of the type operative to dig, elevate, and dump material; the implement being especially useful for loading trucks, wagons, or the like.

Another object of the invention is to provide a tractor scoop adapted to be mounted on a tractor at the rear thereof, with the scoop positioned, when lowered, to dig relatively close to the rear wheels of the tractor, so that an excellent digging force is imparted to said scoop. Additionally, the implement is easy to maneuver when mounted as above.

A further object of the invention is to provide an implement, of the type described, adapted to be mounted in connection with the power-actuated lift link assembly on the rear of a wheeled tractor, whereby such assembly functions to impart a part of the lifting motion of the scoop; the implement including a power cylinder therein as the major lifting instrumentality.

An additional object of the invention is to provide a tractor scoop which includes a power cylinder-actuated lifting mechanism, as above, arranged so that when actuated, it first causes the scoop to tilt in a direction to slightly raise its cutting edge from digging position whereby to help retain the load, and then causes the scoop to elevate while remaining in said tilted position. In this manner a greater load can be carried in the scoop than otherwise.

It is also an object to provide a tractor scoop which can be installed on, or removed from, the tractor, quickly and with ease.

A further object of the invention is to produce a practical tractor scoop, and one which will be exceedingly effective for the purpose for which it is designed.

These objects are accomplished by means of such structure and relative arrangement of parts as will fully appear by a perusal of the following specification and claims:

In the drawings:

Fig. 3 is a fragmentary side elevation showing, in full lines, the height at which the scoop can be elevated by the main power cylinder, and showing, in dotted lines, the additional distance which the scoop may be elevated by operation of the lift mechanism of the tractor.

Fig. 4 is a plan view of the implement, detached from the tractor.

Fig. 5 is a fragmentary side elevation showing the scoop in dumping position.

Figure 1:
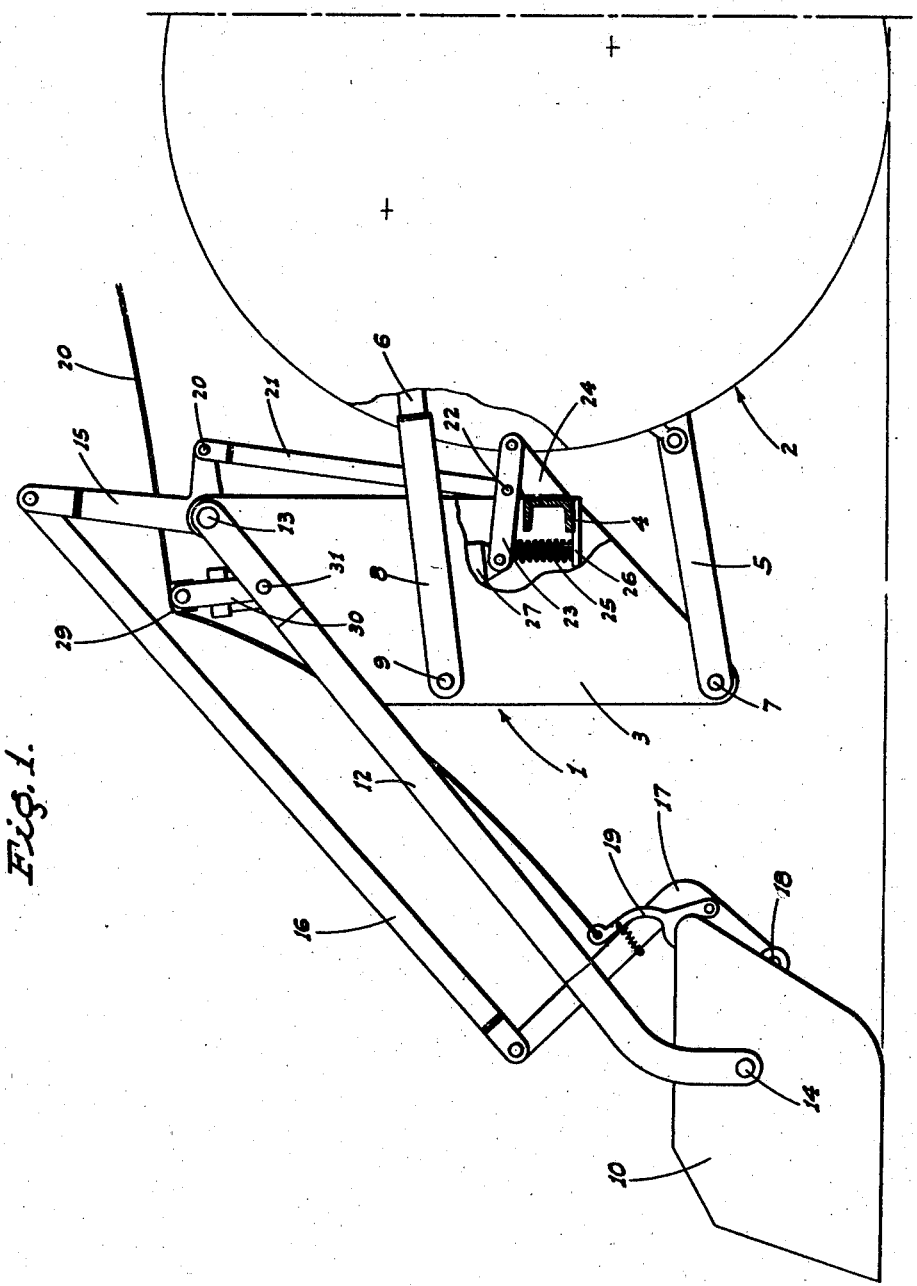
Fig. 1 is a side elevation of the implement as mounted on a tractor at the rear thereof; the scoop being shown in digging position.

Referring now more particularly to the characters of reference on the drawings, the implement comprises an upstanding frame, indicated generally at 1, adapted to be disposed adjacent but to the rear of a wheeled tractor, indicated generally at 2; said upstanding frame 1 including transversely spaced, facing side plates 3 connected together in rigid relation by means including a cross beam 4 disposed at the front end below the center of said frame.

The tractor 2 is of a type, such as the "Ford-Ferguson," which incorporates a power-actuated lift link assembly which includes a transversely spaced pair of rearwardly projecting lift links 5 and a centrally disposed top link 6 thereabove. The upstanding frame 1 is secured to said lift link assembly by pivoting the lift links 5 to the corresponding ones of the side plates 3 at the lower ends of the latter, as at 7, and providing the top link 6 with a rearwardly opening yoke 8 which straddles the frame 1 from the front end pivots, as at 9, to the side plates 3 adjacent the rear edges thereof some distance above the pivots 7. The lift links 5 are power actuated by means of a hydraulic cylinder assembly (not shown) on the tractor, and which hydraulic cylinder is controlled by the operator of the tractor by a hand valve interposed in the fluid pressure supply system for said assembly.

A rearwardly opening scoop 10 is disposed to the rear of the frame 1, and the free edge of the bottom of said scoop is formed as a cutting edge 11. A transversely spaced pair of rigid links 12 are pivotally connected, at their upper ends, to a cross shaft 13 on the frame 1 at the top thereof; said links 12 extending from the cross shaft 13 at a normal downward and rearward incline. At their lower ends the links 12 include downturned portions, as shown, which pivot, as at 14, to opposite sides of the scoop 10 between the front and rear of the same and slightly above center.

A bellcrank 15 is journaled on the cross shaft 13 centrally between the side plates 3; said bellcrank including a relatively long upstanding leg and a relatively short, forwardly projecting leg, as shown. A rigid link 16 is pivoted at its upper end, to the corresponding end of the bellcrank 15 and extends at a normal rearward and downward incline in substantially parallel relation to the links 12, but some distance above the same.

At its lower end the top link 16 terminates in substantially the vertical plane of the lower pivots 14 of the links 12, and at said lower end the top link 16 is pivoted to the upper end of an L-shaped leg 17 which extends downwardly and rearwardly in overhanging relation to the rear upper edge of the scoop 10. At its lower end the L-shaped leg 17 is pivoted substantially centrally to the back of the scoop 10, as at 18.

Figure 2:
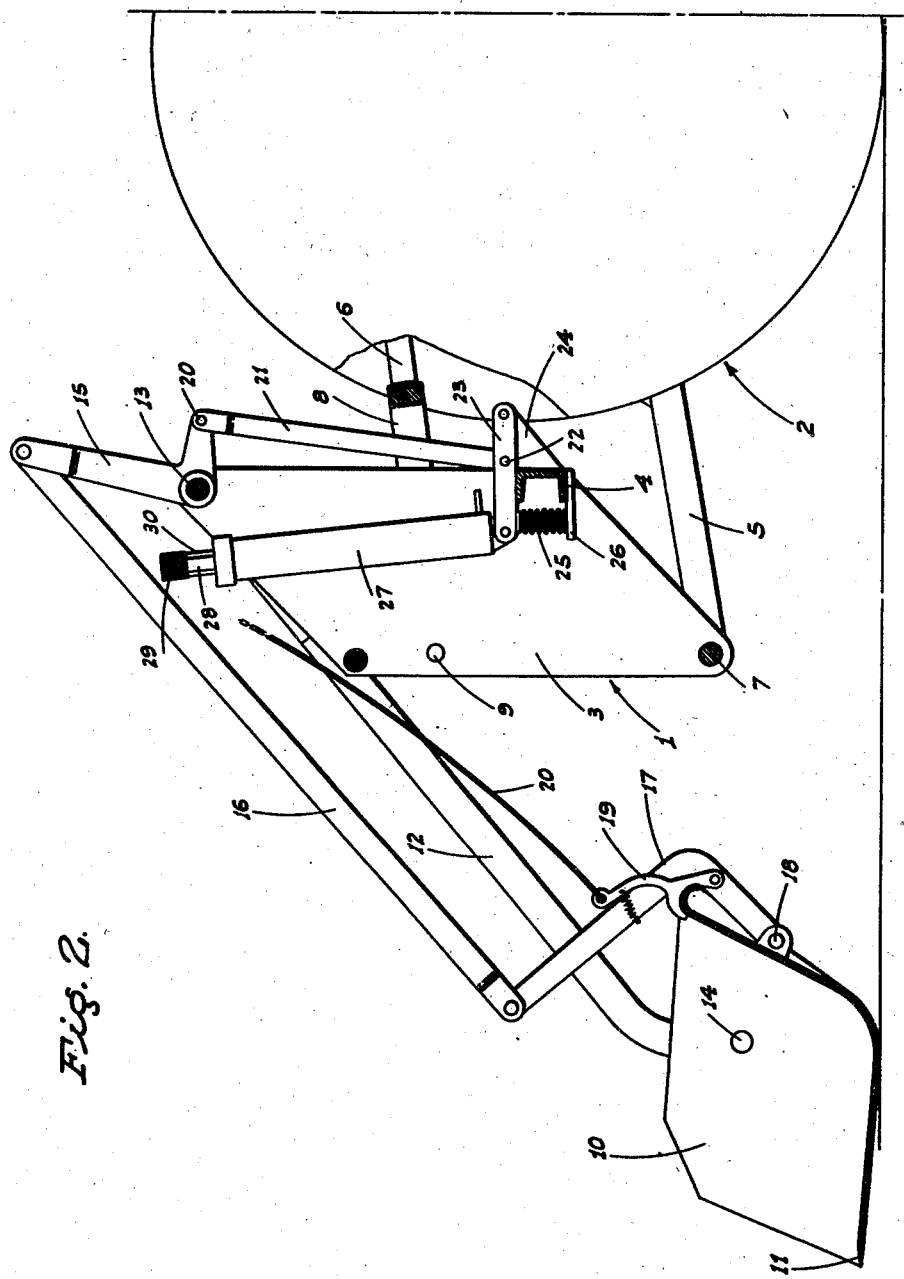
Fig. 2 is a similiar view, but shows the scoop as tilted, whereby to raise the cutting edge somewhat prior to lifting of said scoop.

The L-shaped leg 17 is normally maintained in rigid relation to the scoop 10, and in the position shown in Figs. 1 and 2, by means of a releasable spring-return latch 19 pivoted on the leg 17, and arranged to cooperatively but releasably engage with the upper rear edge of the scoop. The latch 19 is adapted to be released by means of a pull cord 20 which extends forwardly to a point accessible by the tractor operator.

The relatively short, forwardly projecting leg of the bellcrank 15 is pivotally connected, as at 20, to the upper end of an upstanding link 21 whose lower end is pivotally connected, as at 22, to a lever 23. At its forward end the lever 23 is pivoted, for vertical swinging motion, to a bracket 24 on and projecting forwardly from the cross beam 4. From the bracket 24 the lever 23 normally extends rearwardly at a slight upward incline and in clearance relation to the top of said beam 4. The rear end portion of the lever 23 seats on the upper end of a heavy-duty compression spring 25 which rests at its other end on a platform 26 carried by the cross beam; said spring serving to normally maintain the lever 23 in clearance relation above the cross beam 4, as shown in Fig. 1.

An upstanding fluid pressure actuated power cylinder 27 is pivoted, at its lower end, in connection with the rear end of the lever 23 and thence extends upwardly between the side links 12 to a termination adjacent but below the top link 16. The piston rod 28 of the cylinder 27 projects upwardly to connection with a cross bar 29 having pivotally mounted legs 30 on opposite ends thereof which connect with the side links 12, as at 31, adjacent the upper ends of the latter but short of the cross shaft 13.

The above described implement functions as follows:

With the parts in digging position, as in Fig. 1, the tractor is maneuvered to cause the scoop 10 to dig a load of material thereinto. When the scoop 10 is loaded, the fluid pressure actuated power cylinder 27 is operated through the medium of a valve-controlled fluid pressure supply system (not shown). When the cylinder 27 first begins to extend from its normally retracted position, the weight of the load then carried by the scoop 10 and the described assembly of links 12 and 16 initially prevent rising of the piston rod 28, whereupon the cylinder 27 moves downwardly against the compression of spring 25, swinging the lever 23 downward into engagement with the cross beam 4. With such downward movement of the lever 23 the link 21 is pulled down slightly, causing the bellcrank 15 to turn clockwise, which pulls up on the top link 16 so that the L-shaped leg 17 tilts or cants the scoop 10 about the pivots 14 in a direction such that the cutting edge 11 rises from the digging position of Fig. 1 to the elevated position shown in Fig. 2. This rising of the cutting edge 11 permits the scoop to elevate with a substantially greater load of material therein than would otherwise be possible.

After the scoop tilting motion of the parts, as described above, further operation of the cylinder 27 results in upward projection or advance of the piston rod 28, swinging the side links 12 upwardly from the position shown in Fig. 2 to the elevated position shown in full lines in Fig. 3. During this raising operation the scoop 10 remains in substantially the same tilted position, as in Fig. 2, by reason of the described, substantially parallel assembly of links 12 and 16.

The tractor 2 is then maneuvered until the loaded and elevated scoop 10 is directly over the receptacle into which the load is to be dumped, which receptacle may be the body of a truck, wagon, or the like. The latch 19 is then released by the pull cord, whereupon the scoop 10 automatically dumps by gravity; the dumped position of the scoop being shown in Fig. 5.

If the scoop 10 is not elevated to sufficient height by the maximum stroke of the piston rod 28, further elevation of said scoop, to the position shown in dotted lines in Fig. 3, is accomplished by power actuation of the lift links 5 from the position of Fig. 1 to raise the same between the full and dotted lined positions of Fig. 3.

The parts of the implement are returned to digging position of the scoop by reversal of the above described operation.

If desired, the power cylinder 27 can be interposed in parallel in the valve controlled, fluid pressure supply system (not shown) for the hydraulic cylinder assembly on the tractor which actuates the lift links 5, and in such event the cylinder 27 is of an effective diameter such that it functions in advance of the hydraulic cylinder assembly which operates the links 5. It will thus be seen that in such an arrangement, as contemplated in this paragraph, the scoop would first be lifted by the power cylinder 27, and subsequently by the lift links 5; this sequential operation of course being reversed when the scoop is lowered from elevated to digging position.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A scoop-type implement comprising an upstanding frame, a scoop disposed outwardly of the frame, a vertically swingable linkage assembly pivotally connected between the frame and the scoop, said linkage assembly supporting the scoop for movement between a lowered digging and loading position to an elevated dumping position, said scoop being pivoted to said linkage assembly for downward tilting to dump, a releasable latch normally preventing dumping of the scoop, and power mechanism between the frame and linkage assembly operative to swing the latter upwardly and to control lowering thereof; the scoop having a cutting edge, there being means including said linkage assembly in part operative, upon initial actuation of the power mechanism, to tilt the scoop in a direction to relatively elevate said cutting edge to a given extent and prior to elevation of the scoop by said mechanism from said digging position to dumping position.

2. A scoop-type implement comprising an upstanding frame, a scoop disposed outwardly of the frame, a pair of transversely spaced links vertically swingably connected to the frame and extending at a normal outward and downward incline to the scoop, the scoop being pivoted on opposite sides to the lower ends of corresponding ones of the pair of links for tilting to dump from a normal load-supporting position, another vertically swingable link disposed above and between said pair of links connected at its upper end with the frame and terminating at its lower end adjacent and above the scoop, an L-shaped leg pivoted at its upper end to the lower end of said other link, the lower end of the leg being pivoted to the scoop at the back thereof, the scoop opening away from the frame and having a cutting edge at the open end thereof, a releasable latch normally engaged between the L-shaped leg and scoop arranged to prevent tilting of the latter to dump, and power mechanism connected between the frame and said pair of links operative to swing the latter upward and to control lowering thereof.

3. An implement as in claim 2 including means operated by said power mechanism, upon initial actuation thereof, to shift said other link upwardly to an extent to cause the scoop to relatively tilt in a direction to elevate the cutting edge to a given extent and prior to upward swinging of said pair of links by continued actuation of the power mechanism.

4. A scoop-type implement comprising an upstanding frame, a scoop disposed outwardly of the frame, a pair of transversely spaced links vertically swingably connected to the frame and extending at a normal outward and downward incline to the scoop, the scoop being pivoted on opposite sides to the lower ends of corresponding ones of the pair of links for tilting to dump from a normal load-supporting position, another vertically swingable link disposed above and between said pair of links connected at its upper end with the frame and terminating at its lower end adjacent and above the scoop, an L-shaped leg pivoted at its upper end to the lower end of said other link, the lower end of the leg being pivoted to the scoop at the back thereof, the scoop opening away from the frame and having a cutting edge at the open end thereof, a releasable latch normally engaged between the L-shaped leg and scoop arranged to prevent tilting of the latter to dump, and a fluid pressure actuated power cylinder connected between the frame and said pair of links operative to swing the latter upwardly and to control lowering thereof.

5. A scoop-type implement comprising an upstanding frame, a scoop disposed outwardly of the frame, a pair of transversely spaced links vertically swingably connected to the frame and extending at a normal outward and downward incline to the scoop, the scoop being pivoted on opposite sides to the lower ends of corresponding ones of the pair of links for tilting to dump from a normal load-supporting position, another vertically swingable link disposed above and between said pair of links connected at its upper end with the frame and terminating at its lower end adjacent and above the scoop, an L-shaped leg pivoted at its upper end to the lower end of said other link, the lower end of the leg being pivoted to the scoop at the back thereof, the scoop opening away from the frame and having a cutting edge at the open end thereof, a releasable latch normally engaged between the L-shaped leg and scoop arranged to prevent tilting of the latter to dump, and a fluid pressure actuated power cylinder connected between the frame and said pair of links operative to swing the latter upwardly and to control lowering thereof; there being supporting means mounted in the frame for limited downward motion, the power cylinder being secured to said supporting means, a spring resisting such downward motion of the supporting means, and instrumentalities connected between the supporting means and said other link operative to convert downward motion of said supporting means to longitudinal movement of said other link in a direction to cause the scoop to tilt in a direction to relatively elevate the cutting edge thereof.

6. An implement as in claim 5 in which said supporting means includes a lever pivoted for downward swinging movement against the spring, the power cylinder being connected at its lower end to the lever, an upstanding actuating link pivoted to the lever, and a bellcrank journaled on the frame on a transverse axis, the upper end of the actuating link being pivoted to one leg of the bellcrank, and the adjacent end of said other link being pivoted to the other leg of the bellcrank, whereby downward motion of the actuating link causes upward motion of said other link.

7. A scoop-type implement comprising an upstanding frame having facing, transversely spaced side plates rigidly connected together, a cross shaft extending between the plates at the upper end of the frame, a transversely spaced pair of links pivoted to the shaft and extending at a normal downward and outward incline, a scoop disposed between the lower ends of the links and pivoted thereto for tilting to dump from a normal material supporting position, the scoop opening away from the frame and having a cutting edge at the open end, a bellcrank journaled on the cross shaft and having an upstanding leg and a forwardly projecting leg, a top link pivoted at its upper end to the upstanding leg of the bellcrank and normally extending at a downward and outward incline to a termination adjacent but above the scoop, an L-shaped leg pivoted on the lower end of the top link, and depending rearwardly of the scoop, the lower end of said leg being pivoted to the scoop at the rear, a releasable catch connected between said leg and the scoop normally preventing the latter tilting to dump, and a fluid pressure actuated power cylinder mounted in the frame and connected to said pair of links to swing the same upwardly and to control lowering thereof; there being means operated by initial actuation of the power cylinder to swing the forwardly projecting leg of the bellcrank downwardly whereby to shift the top link upwardly so as to cause the scoop to tilt upward at its cutting edge.

8. A scoop-type implement comprising an upstanding frame having facing, transversely spaced side plates rigidly connected together, a cross shaft extending between the plates at the upper end of the frame, a transversely spaced pair of links pivoted to the shaft and extending at a normal downward and outward incline, a scoop disposed between the lower ends of the links and pivoted thereto for tilting to dump from a normal material supporting position, the scoop opening away from the frame and having a cutting edge at the open end, a bellcrank journaled on the cross shaft and having an upstanding leg and a forwardly projecting leg, a top link pivoted at its upper end to the upstanding leg of the bellcrank and normally extending at a downward and outward incline to a termination adjacent but above the scoop, an L-shaped leg pivoted on the lower end of the top link and depending rearwardly of the scoop, the lower end of said leg being pivoted to the scoop at the rear, a releasable catch connected between said leg and the scoop normally preventing the latter tilting to dump, a downwardly movable lever pivoted in the main frame, a spring resisting and a stop to limit such downward movement of the lever, a fluid pressure actuated power cylinder connected between the lever and said pair of links, and an actuating link pivotally connected between said lever and the forwardly projecting leg of the bellcrank.

9. A scoop-type implement for a tractor which includes, at the rear thereof, a power actuated lift assembly; the implement comprising an upstanding frame, means adapted to connect the frame with the lift assembly of the tractor whereby to lift said frame, a scoop disposed to the rear of the frame, a linkage assembly separate from said lift assembly and connected between the frame and scoop and supporting said scoop for movement between a lowered digging and loading position to an elevated dumping position, and power mechanism connected between the frame and linkage assembly operative to swing the latter upwardly and to control lowering thereof.

10. A scoop-type implement for a tractor which includes, at the rear thereof, a power actuated lift assembly; the implement comprising an upstanding frame, means adapted to connect the frame with the lift assembly of the tractor whereby to lift said frame, a scoop disposed to the rear of the frame, a linkage assembly separate from said lift assembly and connected between the frame and scoop and supporting said scoop for movement between a lowered digging and loading position to an elevated dumping position, and power mechanism connected between the frame and linkage assembly operative to swing the latter upwardly and to control lowering thereof; said frame connecting means including transversely spaced pivots on the frame at opposite sides thereof, the lift assembly having a pair of lift links for connection with said pivots, and a yoke being adapted to be connected with the tractor above said lift links.

11. In combination, a wheel tractor having a pair of transversely spaced, rearwardly projecting lift links, said lift links being power actuated, an upstanding frame disposed to the rear of the tractor, means pivoting the lift links to the frame, a top link pivotally connected between the frame and tractor above the lift links, a scoop disposed to the rear of the frame, a linkage assembly separate from the lift links and connected between the frame and scoop and supporting said scoop for movement between a lowered digging and loading position to an elevated dumping position, and power mechanism connected between the frame and linkage assembly operative to swing the latter upwardly and to control lowering thereof.

12. In combination, a wheel tractor having a pair of transversely spaced, rearwardly projecting lift links, said lift links being power actuated, an upstanding frame disposed to the rear of the tractor, means pivoting the lift links to the frame, a top link pivotally connected between the frame and tractor above the lift links, a scoop disposed to the rear of the frame, a linkage assembly separate from the lift links and connected between the frame and scoop and supporting said scoop for movement between a lowered digging and loading position to an elevated dumping position, and power mechanism connected between the frame and linkage assembly operative to swing the latter upwardly and to control lowering thereof; said top link including a rearwardly opening yoke at its rear and straddling and pivoted to the frame at transversely spaced points.

13. A scoop type implement comprising in combination with a tractor provided with lift links, a frame pivoted to the links whereby upon operation of said links the frame may be selectively vertically lifted or lowered, vertically spaced parallel links pivotally connected at their inner ends to the frame at a point above said lift links a scoop, the outer ends of said parallel links being pivotally connected to the scoop, and means to operate the parallel links to lower the scoop to digging position and to lift it to dumping position.

FRANK M. FRAGA.

REFERENCES CITED

The following references are of record in the file of this patent:

UNITED STATES PATENTS

| Number | Name | Date |
| --- | --- | --- |
| 1,517,201 | Easley | Nov. 25, 1924 |
| 1,527,251 | Furst | Feb. 24, 1925 |
| 1,901,555 | Firestone | Mar. 14, 1933 |
| 2,254,292 | Jones | Sept. 2, 1941 |
| 2,397,530 | Brosius | Apr. 2, 1946 |
| 2,412,323 | Conrad | Dec. 10, 1946 |
| 2,414,684 | Wohlforth | Jan. 21, 1947 |
| 2,415,515 | McOscar | Feb. 11, 1947 |